United States Patent

Figas

[11] Patent Number: 5,269,338
[45] Date of Patent: Dec. 14, 1993

[54] AQUARIUM SIPHON APPARATUS

[76] Inventor: Dolores B. Figas, 20193 Keating, Detroit, Mich. 48203

[21] Appl. No.: 988,857
[22] Filed: Dec. 10, 1992
[51] Int. Cl.⁵ .................................. F04F 10/02
[52] U.S. Cl. ................... 137/140; 210/169; 210/232; 210/248; 119/245
[58] Field of Search ........... 210/169, 248, 232, 416.2; 119/5; 137/140, 142, 152; 248/75

[56] References Cited

U.S. PATENT DOCUMENTS

| | | | |
|---|---|---|---|
| 248,886 | 11/1881 | Saal | 137/140 |
| 423,129 | 3/1890 | Clark | 137/140 |
| 756,517 | 8/1902 | Miller | 137/140 |
| 1,230,971 | 6/1917 | Wilson | 137/140 |
| 2,783,893 | 3/1957 | Romanoff | 210/169 |
| 3,783,888 | 1/1974 | Johnson | 137/140 |
| 3,785,493 | 1/1974 | Harding | 210/169 |
| 4,894,156 | 1/1990 | Murken | 210/448 |
| 4,913,811 | 3/1990 | Huang et al. | 210/169 |

Primary Examiner—Peter Hruskoci
Assistant Examiner—Robert James Popovics
Attorney, Agent, or Firm—Leon Gilden

[57] ABSTRACT

A siphon structure includes a hose having an inlet housing whose cylindrical side wall includes a lower portion formed of a mesh web, with the mesh web having openings and the openings including further intersecting filaments therebetween to minimize siphoning force against the inlet cylinder, having a cylinder diameter greater than a siphon tube diameter of the organization preventing drawing of fish thereagainst during siphoning of an associated aquarium.

3 Claims, 4 Drawing Sheets

AQUARIUM SIPHON APPARATUS

BACKGROUND OF THE INVENTION

1. Field of the Invention

The Field of Invention relates to an aquarium apparatus and more specifically to an aquarium siphon apparatus to permit fluid draining of an associated aquarium.

2. Description of the Prior Art

Aquarium cleaning structure such as indicated in U.S. Pat. Nos. 4,913,811; 4,894,156; and 3,785,493 have been provided but have heretofore failed to recognize the siphoning with fish remaining within the tank and accordingly danger of fish being drawn by siphoning action relative to the inlet hose damaging the fish.

The instant organization attempts to overcome deficiencies of the prior art by providing for a mesh inlet housing structure of an enlarged diameter relative to the siphon hose to prevent drawing of fish in a damaging manner against the inlet hose structure.

SUMMARY OF THE INVENTION

In view of the foregoing disadvantages inherent in the known types of siphon apparatus now present in the prior art, the present invention provides an aquarium siphon apparatus wherein the same employs an enlarged cylindrical housing relative to a siphon hose to prevent damaging fish drawn against the inlet housing. As such, the general purpose of the present invention, which will be described subsequently in greater detail, is to provide a new and improved aquarium siphon apparatus which has all the advantages of the prior art siphon apparatus and none of the disadvantages.

To attain this, the present invention provides a siphon structure including a hose having an inlet housing whose cylindrical side wall includes a lower portion formed of a mesh web, with the mesh web having openings and the openings including further intersecting filaments therebetween to minimize siphoning force against the inlet cylinder, having a cylinder diameter greater than a siphon tube diameter of the organization preventing drawing of fish thereagainst during siphoning of an associated aquarium.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved aquarium siphon apparatus which has all the advantages of the prior art siphon apparatus and none of the disadvantages.

It is another object of the present invention to provide a new and improved aquarium siphon apparatus which may be easily and efficiently manufactured and marketed.

It is a further object of the present invention to provide a new and improved aquarium siphon apparatus which is of a durable and reliable construction.

An even further object of the present invention is to provide a new and improved aquarium siphon apparatus which is susceptible of a low cost of manufacture with regard to both materials and labor, and which accordingly is then susceptible of low prices of sale to the consuming public, thereby making such aquarium siphon apparatus economically available to the buying public.

Still yet another object of the present invention is to provide a new and improved aquarium siphon apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
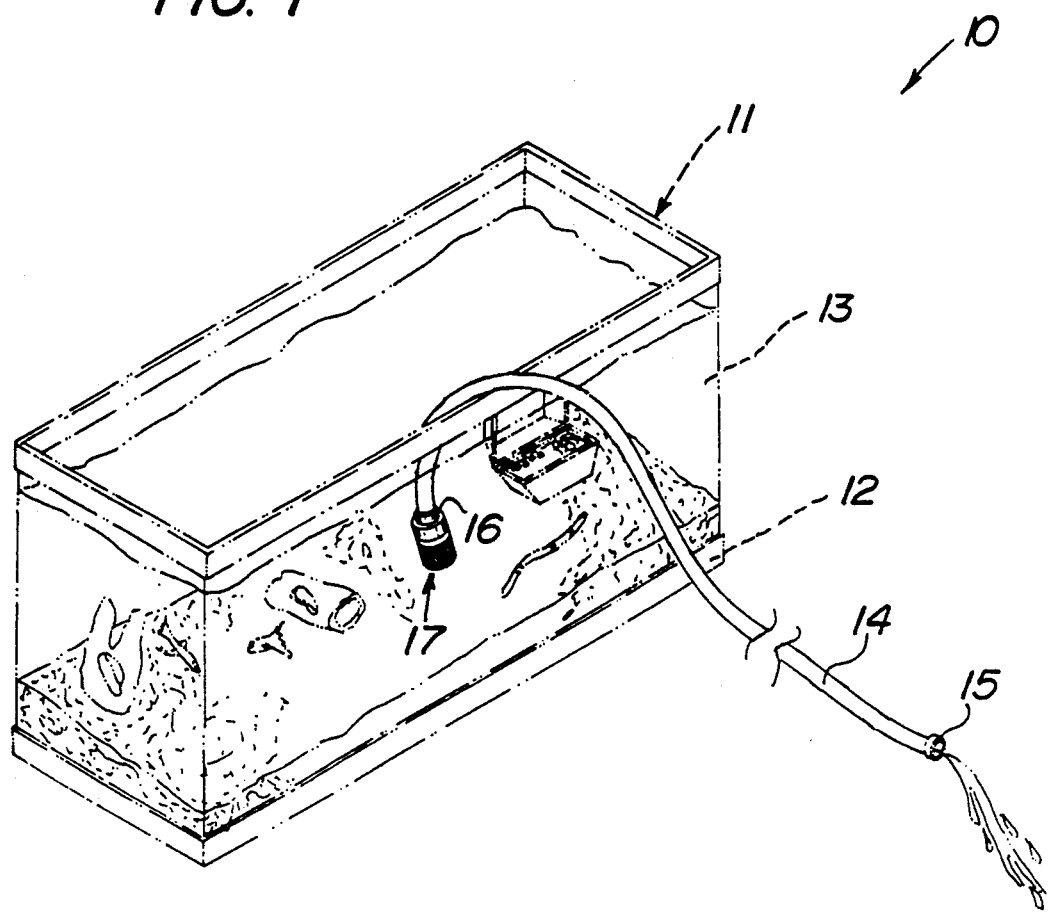
FIG. 1 is an isometric illustration of the invention.
Figure 2:
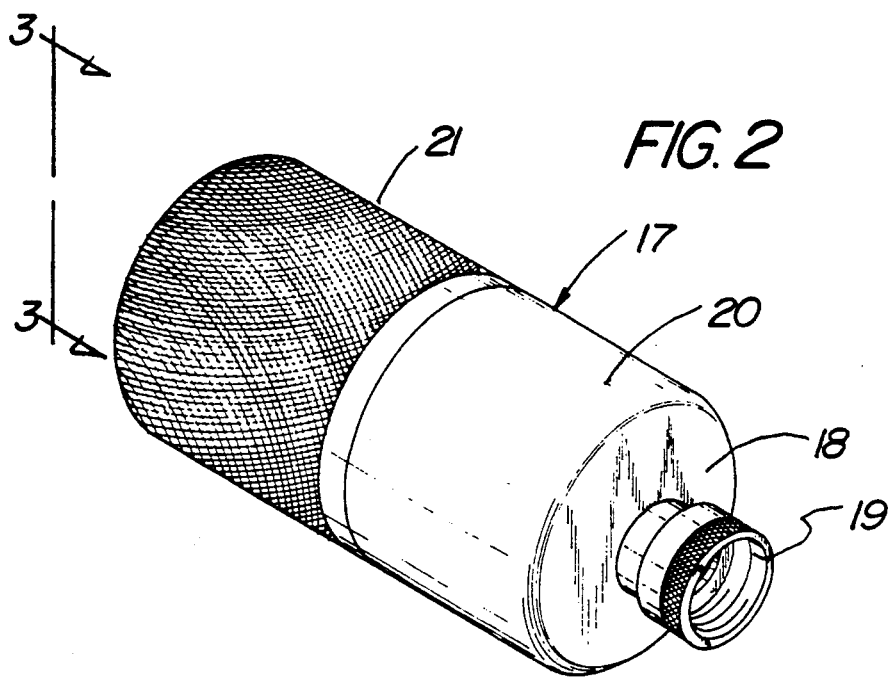
FIG. 2 is an enlarged isometric illustration of the inlet housing.
Figure 3:
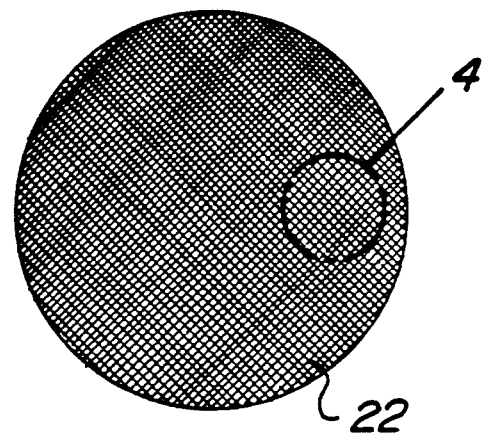
FIG. 3 is an orthographic view, taken along the lines 3—3 of FIG. 2 in the direction indicated by the arrows.
Figure 4:
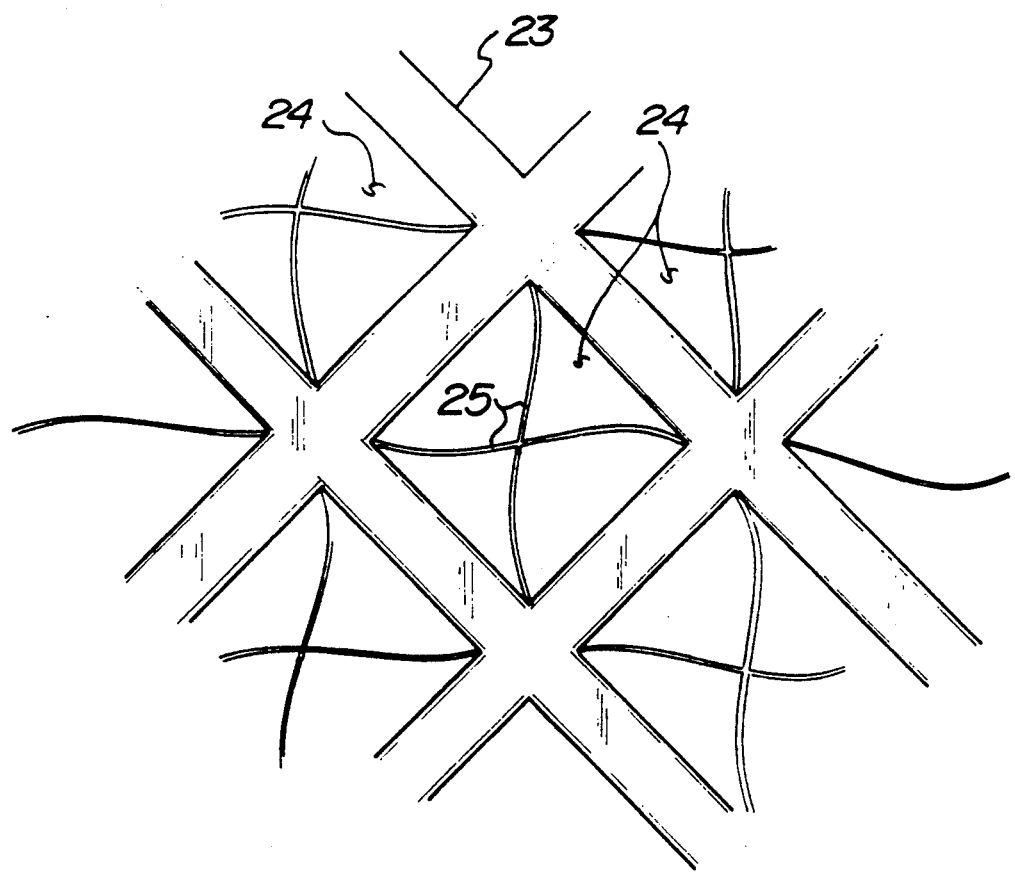
FIG. 4 is an enlarged orthographic view of section 4 as set forth in FIG. 3.

With reference now to the drawings, and in particular to FIGS. 1 to 8 thereof, a new and improved aquarium siphon apparatus embodying the principles and concepts of the present invention and generally designated by the reference numeral 10 will be described.

More specifically, the aquarium siphon apparatus 10 of the invention essentially comprises the siphoning of an aquarium tank 11, having a tank floor frame 12 mounting typically transparent side wall panels 13 to provide enclosure for containing the fluid and associated components of an aquarium. A flexible siphon hose 14 is provided, having a first end 15 positioned exteriorly of the tank 11, with a second end 16 positioned within the tank mounted to a cylindrical inlet housing 17 of rigid construction. The inlet housing 17 includes a first end wall 18 spaced from a second end wall 22. An internally threaded socket 19 is rotatably mounted to the first end wall 18 for threaded engagement of the siphon hose externally threaded first end 15. The housing 17 further includes a first cylindrical side wall portion 20 of a fluid impermeable material, and a second cylindrical side wall portion 21 extending medially of the side wall of the housing, to include the second end wall 22 formed of a rigid mesh web 23 of fluid permeable material having mesh web openings 24 in a matrix configuration. Each of the openings 24 includes a plurality of flexible intersecting filaments 25 intersecting medially of each opening 24 to prevent drawing of small aquarium fish into the housing structure. The housing structure further is defined by a housing diameter greater than a hose diameter defined by the siphon hose 14 to minimize siphoning force against the housing and the damaging of fish when directed thereagainst.

Figure 5:
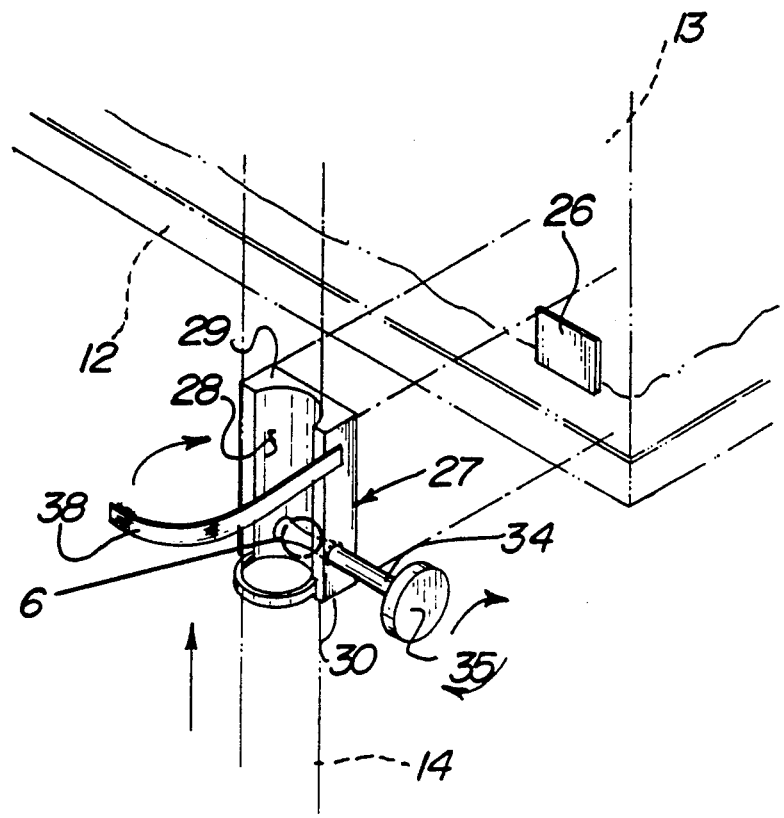
FIG. 5 is an isometric illustration of a guide block employed by the invention to position the siphon hose thereto.
Figure 6:
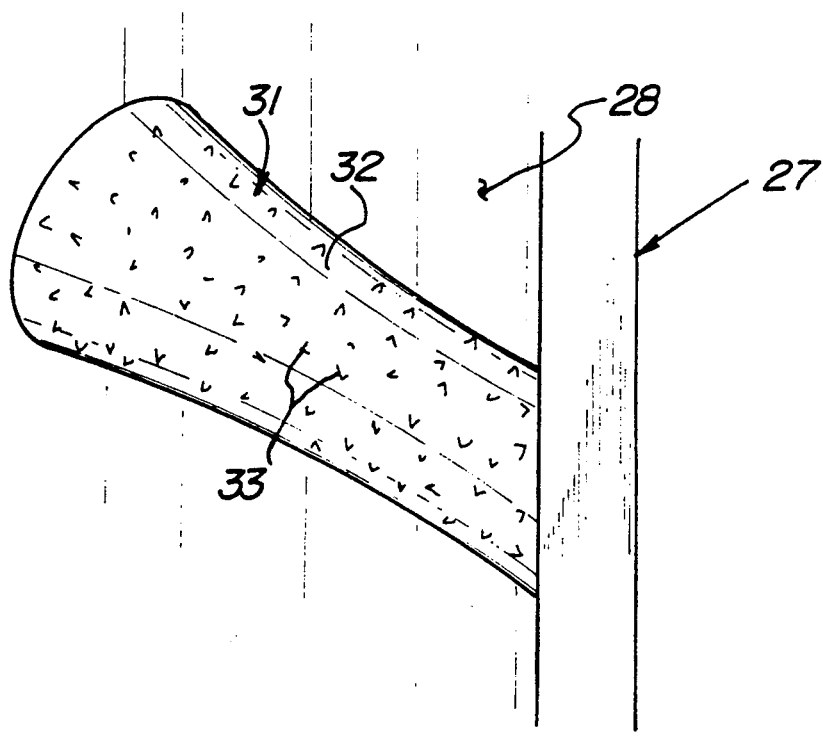
FIG. 6 is an enlarged isometric illustration of section 6 as set forth in FIG. 5.

The FIG. 5 indicates the use of a magnetic plate 26 adherably secured to the tank 11, such as to the panel 13, or alternatively to the floor frame 12. First metallic guide block 27 is provided, having a block top wall 29 spaced from a block bottom wall 30, with a semi-cylindrical recess 28 extending coextensively between the top and bottom walls 29 and 30. A roller 31 is rotatably mounted within the recess, having a concave engaging surface 32 to engage the siphon hose 14. A strap member 39 having a fastening end to extend between the side walls of the guide block is arranged to position and secure the siphon hose in engagement with the roller 31. The roller 31 having a concave engaging surface 32 and the projections 33 is arranged for gripping the siphon hose permitting its reciprocation relative to the guide block by the rotation of the roller axle 34 coaxially directed through the roller terminating in an axle handle 35 permitting ease of rotation of the roller 31. In this manner, the siphon hose may be reciprocated upwardly towards the block top wall 27 to limit siphoning force through the hose 14 by permitting subsequent elevation of the siphoning hose above the inlet housing 17 to in this manner terminate and otherwise control siphoning force directed towards the inlet housing 17.

Figure 7:
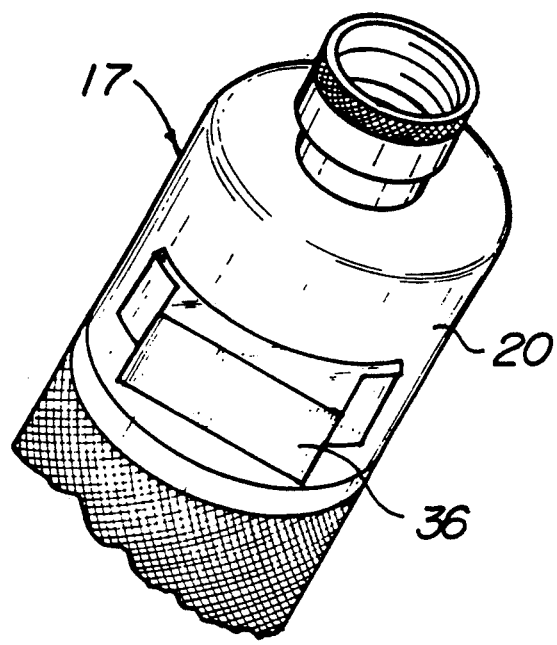
FIG. 7 is an isometric illustration of the inlet housing employing a mounting magnet.
Figure 8:
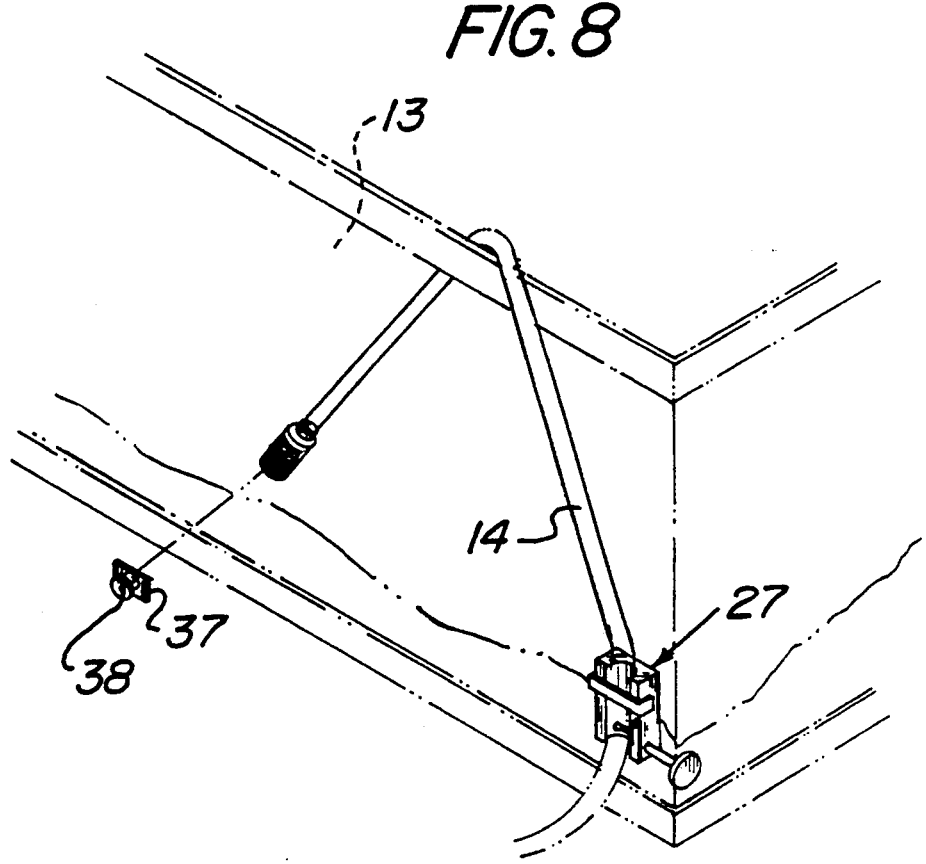
FIG. 8 is an isometric illustration of the invention indicating the use of a cooperating magnet relative to the inlet housing for positioning the inlet housing relative to a side wall panel of the aquarium structure.

The FIGS. 7 and 8 indicates the inlet housing 17 having a first magnet 36 mounted to the first side wall portion 20, including a projecting face of a first polarity, with a second magnet 37 having a confronting face of a second polarity positioned on an exterior surface of a side wall panel 13 for magnetically adhering the first magnet 36 to thereby provide desired orientation of the inlet housing within the aquarium tank 11. The second magnet 37 is provided with a second magnet handle 38 for ease of manual manipulation of the second magnet in its orientation relative to the side wall panel 13, as indicated in FIG. 8.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An aquarium siphon apparatus arranged for siphoning of fluid from an aquarium tank, wherein the aquarium tank includes side wall panels and a floor frame, wherein the apparatus comprises,
   a flexible siphon hose, the siphon hose having a first end and a second end, the second end having a second end coupling, and
   a cylindrical inlet housing, the inlet housing having a housing first end wall spaced from a housing second end wall, and a cylindrical side wall, wherein the cylindrical side wall includes a first side wall portion extending into the first end wall, and a second side wall portion extending into the second side wall, the first side wall portion formed of a fluid impermeable material, and the second side wall portion formed of a fluid permeable material, and
   the first end wall having a first end wall coupling arranged for mounting to the second end coupling, and
   the second side wall portion includes a rigid mesh web, the rigid mesh web having a matrix of openings directed therethrough, and each of the openings having a plurality of flexible intersecting filaments, with the filaments intersecting medially of each opening.

2. An apparatus as set forth in claim 1 including a magnetic plate, the magnetic plate arranged for adherence to the tank, and the magnetic plate including a ferrous metallic guide block, the guide block including a block top wall spaced from a block bottom wall, and a semi-cylindrical recess extending between the top wall and the bottom wall, and a roller rotatably mounted within the recess intermediate the top wall and the bottom wall, the roller including a concave engaging surface having a plurality of projections thereon, with the siphon hose arranged for engagement with the roller within the semi-cylindrical recess, and a strap member secured to the guide block arranged for extending around the siphon hose for securing the siphon hose into communication with the roller, and the roller including a roller axle, and the roller axle projecting exteriorly of the guide block permitting rotation of the roller axle for rotation for reciprocating the siphon hose relative to the semi-cylindrical recess.

3. An apparatus as set forth in claim 2 wherein the first side wall portion of the cylindrical inlet housing includes a first magnet, the first magnet having a projecting face of a first polarity, and a second magnet having a second magnet handle, the second magnet having a second magnet projecting face of a second polarity, wherein the second magnet is arranged for orientation about an exterior surface of said side wall panel for engagement with the first magnet positioned upon an interior surface of the side wall panel.

* * * * *